US006224714B1

(12) United States Patent
Schroeder et al.

(10) Patent No.: US 6,224,714 B1
(45) Date of Patent: May 1, 2001

(54) SYNTHETIC POLYMERS HAVING HYDROGEN BONDING CAPABILITY AND CONTAINING POLYSILOXANE MOIETIES

(75) Inventors: Wen Zyo Schroeder, Appleton; Daniel Arthur Clarahan, Greenleaf; Mike Thomas Goulet; Thomas Gerard Shannon, both of Neenah, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/449,261

(22) Filed: Nov. 24, 1999

Related U.S. Application Data

(60) Provisional application No. 60/117,166, filed on Jan. 25, 1999.

(51) Int. Cl.$^7$ .................................................. D21H 11/00
(52) U.S. Cl. ..................... 162/164.4; 162/181.6; 162/158; 162/185; 162/111; 162/183; 162/168.2; 162/169; 428/57; 428/58; 428/59; 428/447
(58) Field of Search ................ 162/164.4, 181.6, 162/158, 185, 111, 183, 168.2, 169; 428/57, 58, 59, 447

(56) References Cited

U.S. PATENT DOCUMENTS

| | | |
|---|---|---|
| 3,671,502 | 6/1972 | Samour et al. . |
| 4,728,696 | 3/1988 | Van Phung et al. . |
| 4,921,902 | 5/1990 | Evani et al. . |
| 5,177,165 | 1/1993 | Valint, Jr. et al. . |
| 5,320,711 | 6/1994 | Dauplaise et al. . |
| 5,507,914 | 4/1996 | Sarkar et al. . |
| 5,591,306 | 1/1997 | Kaun . |
| 5,651,861 | 7/1997 | Larson et al. . |
| 5,695,607 | 12/1997 | Oriaran et al. . |
| 5,723,022 | 3/1998 | Dauplaise et al. . |
| 5,746,887 | 5/1998 | Wendt et al. . |
| 5,772,845 | 6/1998 | Farrington, Jr. et al. . |
| 5,785,813 | 7/1998 | Smith et al. . |
| 5,789,516 | 8/1998 | Gravier et al. . |
| 5,852,095 | 12/1998 | Yamauchi et al. . |
| 5,874,495 | 2/1999 | Robinson . |
| 5,904,810 | * 5/1999 | Schroeder ........................ 162/111 |

FOREIGN PATENT DOCUMENTS

WO 98/45530
A1    10/1998   (WO) .

* cited by examiner

*Primary Examiner*—Peter Chin
*Assistant Examiner*—Mark Halpern
(74) *Attorney, Agent, or Firm*—Gregory E. Croft

(57) ABSTRACT

Synthetic polymers having hydrogen bonding capability and one or more polysiloxane moieties are capable of providing two distinct properties to paper products, such as tissues, which properties heretofore have been imparted through the use of at least two different molecules. The backbone of these synthetic polymers is based on modified vinyl polymers, such as polyvinyl alcohol, polyacrylamides and polyacrylic acids.

98 Claims, No Drawings

SYNTHETIC POLYMERS HAVING HYDROGEN BONDING CAPABILITY AND CONTAINING POLYSILOXANE MOIETIES

This application claims the benefit of Provisional No. 60/117,166 filed Jan. 25, 1999.

BACKGROUND OF THE INVENTION

In the manufacture of paper products, such as facial tissue, bath tissue, paper towels, dinner napkins and the like, a wide variety of product properties are imparted to the final product through the use of chemical additives. Examples of such additives include softeners, debonders, wet strength agents, dry strength agents, sizing agents, opacifiers and the like. In many instances, more than one chemical additive is added to the product at some point in the manufacturing process. Unfortunately, there are instances where certain chemical additives may not be compatible with each other or may be detrimental to the efficiency of the papermaking process, such as can be the case with the effect of wet end chemicals on the downstream efficiency of creping adhesives. Another limitation, which is associated with wet end chemical addition, is the limited availability of adequate bonding sites on the papermaking fibers to which the chemicals can attach themselves. Under such circumstances, more than one chemical functionality competes for the limited available bonding sites, oftentimes resulting in the insufficient retention of one or both chemicals on the fibers. For more complex chemical systems it may be desirable to have two or more functional additives retained in a specified ratio and/or spatial arrangement relative to one another. Although the addition of chemicals in a pre-determined ratio is easily achieved, retention of these chemicals in a predictable ratio is difficult using wet end chemical addition because of site competition and other influencing factors. Another limitation of either wet end or topical chemical addition is the inability to predictably locate functional chemical moieties in proximity to each other on the fiber surface.

Therefore, there is a need for a means of applying more than one chemical functionality to a paper web that mitigates the limitations created by limited number of bonding sites and the unpredictable nature of chemical additive retention which limits the ability to retain functional groups in a specified ratio and/or spatial arrangement with respect to one another.

SUMMARY OF THE INVENTION

In certain instances, two or more chemical functionalities can be combined into a single molecule, such that the combined molecule imparts at least two distinct product properties to the final paper product that heretofore have been imparted through the use of two or more different molecules. More specifically, synthetic polymers, which are commonly used in the paper industry as dry strength resins, wet strength resins and retention aids, can be combined into a single molecule with polysiloxanes, which are utilized in the paper industry as surface modifiers, release agents, antifoams, softeners, debonders, lubricants and sizing agents. The resulting molecule is a synthetic polymer having hydrogen bonding capability and polysiloxane moieties which can provide several potential benefits, depending on the specific combination employed, including: strength aids that impart softness; softeners that do not reduce strength; wet strength with improved wet/dry strength ratio; surface feel modifiers with reduced linting and sloughing; strength aids with controlled absorbency; retention aids that soften; and improved retention of polysiloxanes when added as a wet end additive.

As used herein, "polysiloxanes" are macromolecules with a polymeric backbone of alternating silicon and oxygen atoms (i.e. siloxane bonds) of general structure $-(SiR_AR_BO)_n-$ where $R_A$ and $R_B$ are any organofunctional group and may be the same or different and n is an integer of 1 or greater. The "synthetic polymers", as described herein, have a portion of their structure derived from the polymerization of ethylenically unsaturated compounds which contain pendant groups that can form hydrogen bonds, ionic bonds or covalent bonds with cellulose molecules in fibers, thereby increasing interfiber bonding. They include polyacrylamide, polyvinyl alcohol, polyacrylic acid, polymaleic anhydride, polymaleic acid, polyitaconic acid, cationic polyacrylamides, anionic polyacrylamides, and the like. The synthetic polymers as described herein may be water soluble, organic soluble or soluble in mixtures of water and water miscible organic compounds. Preferably they are water-soluble or water dispersible but this is not a necessity of the invention. Also included within the definition are the salts of the above mentioned acidic polymers. Substances which can be combined with the acidic portion of the polymers to make the salts include the alkali metals such as K and Na usually added in form of their hydroxides, the aliphatic amines and alkanol amines, such salts and methods of preparing such salts being well known to those skilled in the art.

Depending upon the chemical and the desired impact on the paper sheet, the synthetic polymers of this invention may be applied to the paper web by any of the means known to those skilled in the art. Such means include wet end addition, spray addition on the wet web, as a creping chemical sprayed on the Yankee dryer, or as a post treatment addition, including spraying, printing or coating.

Hence in one aspect, the invention resides in a synthetic polymer having hydrogen or covalent bonding capability and containing one or more polysiloxane moieties, said synthetic polymer having the following structure (structure 1):

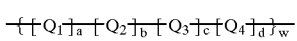

where:

a, b>0;

c,d≧0 such that c+d>0;

w≧1;

$Q_1$=a monomer unit or a block or graft copolymer containing a pendant group capable of forming hydrogen or covalent bonds with cellulose. Preferred pendant groups for hydrogen bonding are —$CONH_2$, —COOH, —$COO^-$ $M^+$, —OH and mixtures of said groups. Preferred pendant groups for covalent bonding are aldehydes and anhydrides. $M^+$ can be any suitable counter ion including $Na^+$, $K^+$, $Ca^{+2}$ and the like.

$Q_2$=a block or graft copolymer containing the siloxane bonds (—Si $R_AR_BO$—). The $R_A$ and $R_B$ functional groups attached to the Si atom can be alkyl or aliphatic hydrocarbons, linear or branched or cyclic, saturated or unsaturated, substituted or unsubstituted (e.g., containing —OH, —$(EtO)_n$, —$(PO)_n$, —COO—, —O—, —CONH—, —$CONH_2$—, —CO—, . . . etc). $Q_2$ may take the form of -$Z_1$-$Q_2$-$Z_1'$- where $Z_1$, $Z_1'$ are any bridging radicals, the same or different, whose purpose is to provide incorporation into the polymer backbone and $Q_2$ is as defined previously;

$Q_3$=a monomer unit or a block or graft copolymer containing a charge functionality. Such charge functionality is preferably cationic but may be anionic or amphoteric; and $Q_4$=a monomer unit or a block or graft copolymer containing a hydrophilic moiety, which is desirable for making the material into a form suitable for papermaking. $Q_4$ may take the form of -$Z_2$-$Q_4$-$Z_2'$- where $Z_2$, $Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the polysiloxane moieties. Examples of suitable $Q_4$ moieties are (but not limited to) the aliphatic polyether derivatives of the formula —$[(CR_1R_2)_xO]_y$—$R_3$, wherein $R_1$, $R_2$ is H or $CH_3$, $x \geq 2$, $y \geq 1$ and $R_3$ is any suitable terminal group including —$CH_3$, —H, —$C_2H_5$, —$NH_2$.

It should be appreciated that when the $Q_3$ or other charged moiety is present in the synthetic polymer, that a suitable counterion will be necessary. Such counterions may or may not be represented in the formulas. Where such counterions are not represented in the formula it should be understood that such an ion will exist. The specific counterion is not critical for the invention, such counterion is only necessary for providing charge balance. For cationically charged groups the most common anions are those of the halides and alkyl sulfates. For anionically charged groups on the polymer the most common counter ions will be those of the alkali and alkaline earth metals as well as ammonia and amine derivatives.

More specifically, the invention resides in a synthetic polymer having the following structure (structure 2):

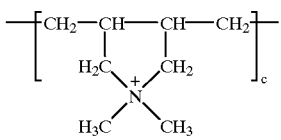

where:
$w \geq 1$;
$R_1, R_1', R_2, R_3$=H, $C_{1-4}$alkyl;
$a, b > 0$;
$c, d \geq 0$ such that $c+d>0$;
$Q_4$=a monomer unit or a block or graft copolymer containing a hydrophilic moiety, which is desirable for making the material into a form suitable for papermaking. $Q_4$ may take the form of -$Z_2$-$Q_4$-$Z_2'$- where $Z_2$, $Z_2'$ are any bridging radicals, the same or different, whose purpose is to provide incorporation into the polymer backbone and $Q_4$is as defined previously. $Q_4$ may be incorporated to offset the increased polymer hydrophobicity caused by introduction of the polysiloxane moieties. Examples of suitable $Q_4$ moieties are (but is not limited to) the aliphatic polyether derivatives of the formula —$[(CR_1R_2)_xO]_y$—$R_3$, wherein $R_1$, $R_2$ is H or $CH_3$, $x \geq 2$, $y \geq 1$ and $R_3$ is any suitable terminal group including —$CH_3$, —H, —$C_2H_5$, —$NH_2$;
$R_0$=any group capable of forming hydrogen or covalent bonds with cellulose. Preferred are —$CONH_2$, —COOH, $COO^-M^+$, —OH, —CONHCHOHCHO and mixtures of said groups;
$A_1$=—H, —COOH;
$R_4$=Z-$R_6$ radical where:
Z=aryl, —$CH_2$—, —COO—, —CONR'—, —O—, —S—, —$OSO_2O$—, —CONHCO—,—CONHCHOHCHOO— or any other radical capable of bridging the $R_6$ group to the vinyl backbone portion of the molecule. (R'=H, alkyl);
$R_6$=a block or graft copolymer containing siloxane bonds;

$R_5$=$Z_3$-$R_{10}$-W;
$Z_3$=aryl, —$CH_2$—, —COO—, —CONH—, —O—, —S—, —$OSO_2O$—, any radical capable of bridging the $R_{10}$ group to the vinyl backbone portion of the molecule;
$R_{10}$=any linear or branched, aliphatic or aromatic hydrocarbon of 2 or more carbons, preferably —$(CH_2CH_2)$—, —$C(CH_3)_2CH_2CH_2$—; and
W=—$N^+R_{11},R_{12},R_{13}$ where $R_{11}$, $R_{12}$, $R_{13}$ is a $C_{1-4}$ alkyl group.
—$[CH_2CR_3R_5]_c$— may also be the residue formed by copolymerization with dimethyldiallyl ammonium chloride. In this case the charge-containing residue —$[CH_2CR_3R_5]_c$— will be the form of monomers with repeat units of structure:

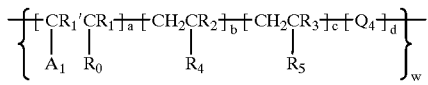

In another aspect, the invention resides in a paper sheet, such as a tissue sheet, comprising a synthetic polymer having hydrogen bonding capability and containing an polysiloxane moiety, said polymer having the following structure:

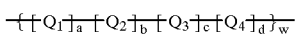

where:
$a, b > 0$;
$c, d \geq 0$;
$w \geq 1$;
$Q_1$=a monomer unit or a block or graft copolymer containing a pendant group capable of forming hydrogen or covalent bonds with cellulose. Preferred pendant groups for hydrogen bonding are —$CONH_2$, —COOH, —$COO^-M^+$, —OH and mixtures of said groups. Preferred pendant groups for covalent bonding are aldehydes and anhydrides. $M^+$ can be any suitable counter ion including $Na^+$, $K^+$, $Ca^{+2}$ and the like;
$Q_2$=a block or graft copolymer containing the siloxane bonds (—Si $R_AR_BO$—). The $R_A$ and $R_B$ functional groups attached to the Si atom can be alkyl or aliphatic hydrocarbons, linear or branched or cyclic, saturated or unsaturated, substituted or unsubstituted (e.g., containing —OH, —$(EtO)_n$, —$(PO)_n$, —COO—, —O—, —CONH—, —$CONH_2$—, —CO—, ... etc). $Q_2$ may take the form of -$Z_1$-$Q_2$-$Z_1'$- where $Z_1$, $Z_1'$ are any bridging radicals, the same or different, whose purpose is to provide incorporation into the polymer backbone and $Q_2$ is as defined previously;
$Q_3$=a monomer unit or a block or graft copolymer containing a charge functionality. Such charge functionality is preferably cationic but may be anionic or amphoteric; and
$Q_4$=a monomer unit or a block or graft copolymer containing a hydrophilic moiety, which is desirable for making the material into a form suitable for papermaking. $Q_4$ may take the form of -$Z_2$-$Q_4$-$Z_2'$- where $Z_2$, $Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the polysiloxane moieties. Examples of suitable $Q_4$ moieties are (but is not limited to) the aliphatic polyether derivatives of the formula —$[(CR_1R_2)_xO]_y$—

$R_3$, wherein $R_1$, $R_2$ is H or $CH_3$, $x \geq 2$, $y \geq 1$ and $R_3$ is any suitable terminal group including —$CH_3$, —H, —$C_2H_5$, —$NH_2$.

More specifically, the invention resides in a paper sheet, such as a tissue sheet, comprising a synthetic polymer having hydrogen bonding capability and containing an polysiloxane moiety, said polymer having the following structure:

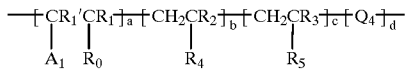

where:
$w \geq 1$;
$R_1, R_1', R_2, R_3 =$ H, $C_{1-4}$ alkyl;
a, b>0;
c,d>,=0;
$Q_4$ = a monomer unit or a block or graft copolymer containing a hydrophilic moiety, which is desirable for making the material into a form suitable for papermaking. $Q_4$ may take the form of -$Z_2$-$Q_4$-$Z_2$'- where $Z_2$, $Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the polysiloxane moieties. Examples of suitable $Q_4$ moieties are (but is not limited to) the aliphatic polyether derivatives of the formula —$[(CR_1R_2)_xO]_y$—$R_3$, wherein $R_1$, $R_2$ is H or $CH_3$, $x \geq 2$, $y \geq 1$ and $R_3$ is any suitable terminal group including —$CH_3$, —H, —$C_2H_5$, —$NH_2$;
$R_0$=any group capable of forming hydrogen or covalent bonds with cellulose. Preferred are —$CONH_2$, —COOH, COO$^-$M$^+$, —OH, —CONHCHOHCHO, and anhydride including mixtures of said groups;
$A_1$=H, COOH;
$R_4$=Z-$R_6$ radical where:
Z=aryl, —$CH_2$—, —COO—, —CONR'—, —O—, —S—, —$OSO_2O$—, —CONHCO—, —CONHCHOHCHOO— or any radical capable of bridging the $R_6$ group to the vinyl backbone portion of the molecule. (R'=—H, alkyl);
$R_6$=a block or graft copolymer containing siloxane bonds;
$R_5$=$Z_3$-$R_{10}$-W; p0 $Z_3$=aryl, —$CH_2$, —COO—, —CONH—, —O—, —S—, —$OSO_2O$— or any radical capable of bridging the $R_{10}$ group to the vinyl backbone portion of the molecule;
$R_{10}$=any linear or branched, aliphatic or aromatic hydrocarbon of 2 or more carbons, preferably —($CH_2CH_2$)—, —$C(CH_3)_2CH_2CH_2$—; and
W=—$N^+R_{11},R_{12},R_{13}$ where $R_{11}$, $R_{12}$, $R_{13}$ is a $C_{1-4}$alkyl group.
—$[CH_2CR_3R_5]_c$— may also be the residue formed by co polymerization with dimethyldiallyl ammonium chloride. In this case the charge-containing residue —$[CH_2CR_3R_5]_c$— will be the form of monomers with repeat units of structure:

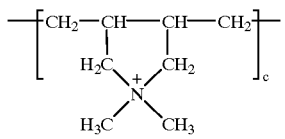

In another aspect, the invention resides in a method of making a paper sheet, such as a tissue sheet, comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymeric additive is added to the aqueous suspension of fibers or to the web, said polymeric additive having the following structure:

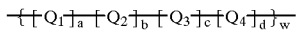

where:
a,b>0;
c,d$\geq$0;
$Q_1$=a monomer unit or a block or graft copolymer containing a pendant group capable of forming hydrogen or covalent bonds with cellulose. Preferred pendant groups for hydrogen bonding are —$CONH_2$, —COOH, —COO$^{-+}$M, —OH and mixtures of said groups. Preferred pendant groups for covalent bonding are aldehydes and anhydrides. M$^+$ can be any suitable counter ion including Na$^+$, K$^+$, Ca$^{+2}$ and the like;
$Q_2$=a block or graft copolymer containing the siloxane bonds (—Si $R_AR_BO$—). The $R_A$ and $R_B$ functional groups attached to the Si atom can be alkyl or aliphatic hydrocarbons, linear or branched or cyclic, saturated or unsaturated, substituted or unsubstituted (e.g., containing —OH, —(EtO)$_n$, —(PO)$_n$, —COO—, —O—, —CONH—, —$CONH_2$—, —CO—, . . . etc). $Q_2$ may take the form of -$Z_1$-$Q_2$-$Z_1$'- where $Z_1$, $Z_1'$ are any bridging radicals, the same or different, whose purpose is to provide incorporation into the polymer backbone and $Q_2$ is as defined previously;
$Q_3$=a monomer unit or a block or graft copolymer containing a charge functionality. Such charge functionality is preferably cationic but may be anionic or amphoteric; and
$Q_4$=a monomer unit or a block or graft copolymer containing a hydrophilic moiety, which is desirable for making the material into a form suitable for papermaking. $Q_4$ may take the form of -$Z_2$-$Q_4$-$Z_2$'- where $Z_2$, $Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the polysiloxane moieties. Examples of suitable $Q_4$ moieties are (but is not limited to) the aliphatic polyether derivatives of the formula —$[(CR_1R_2)_xO]_y$—$R_3$, wherein $R_1$, $R_2$ is —H or —$CH_3$, $x \geq 2$, $y \geq 1$ and $R_3$ is any suitable terminal group including —$CH_3$, —H, —$C_2H_5$, —$NH_2$.

More specifically, the invention resides in a method of making a paper sheet, such as a tissue sheet, comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymeric additive is added to the aqueous suspension of fibers or to the web, said polymeric additive having the following structure:

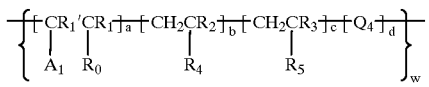

where:
$w \geq 1$;
$R_1, R_1', R_2, R_3$=H, $C_{1-4}$alkyl;

a,b>0;
c,d≧0;
$Q_4$=a monomer unit or a block or graft copolymer containing a hydrophilic moiety, which is desirable for making the material into a form suitable for papermaking. $Q_4$ may take the form of $-Z_2-Q_4-Z_2'-$ where $Z_2$, $Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the polysiloxane moieties. Examples of suitable $Q_4$ moieties are (but is not limited to) the aliphatic polyether derivatives of the formula $—[(CR_1R_2)_xO]_y—R_3$, wherein $R_1$, $R_2$ is H or $CH_3$, $x≧2$, $y≧1$ and $R_3$ is any suitable terminal group including $—CH_3$, $—H$, $—C_2H_5$, $—NH_2$;

$R_0$=any group capable of forming hydrogen or covalent bonds with cellulose. Preferred are $—CONH_2$, COOH, COO$^-$, $—OH$, CONHCHOHCHO, and anhydride including mixtures of said groups;

$A_1$=$—H$, $—COOH$;
$R_4$=Z-$R_6$-Y radical where:
Z=aryl, $—CH_2—$, $—COO—$, $—CONR'—$, $—O—$, $—S—$, $—OSO_2O—$, $—CONHCO—$, $—CONHCHOHCHOO—$ or any radical capable of bridging the $R_6$ group to the vinyl backbone portion of the molecule. (R'=H, alkyl);
$R_6$=a block or graft copolymer containing siloxane bonds;
Y=H, $—N^+R_{11},R_{12},R_{13}$, $—NR_7R_8$, where $R_7$, $R_8$, $R_9$ are same or different and are H or $C_{1-30}$ linear or branched, saturated or unsaturated aliphatic hydrocarbons;
At least one of $R_6$, $R_7$, $R_8$, $R_9$ must be an aliphatic, linear or branched, substituted or non-substituted, hydrocarbon of chain length 8 or higher,
$R_5$=$Z_3$-$R_{10}$-W;
$Z_3$=aryl, $—CH_2—$, $—COO—$, $—CONH—$, $—O—$, $—S—$, $—OSO_2O—$ or any radical capable of bridging the $R_{10}$ group to the vinyl backbone portion of the molecule;
$R_{10}$=any linear or branched, aliphatic or aromatic hydrocarbon of 2 or more carbons, preferably $—(CH_2CH_2)—$, $—C(CH_3)_2CH_2CH_2—$; and
W=$—N^+R_{11},R_{12},R_{13}$ where $R_{11}$, $R_{12}$, $R_{13}$ is a $C_{1-4}$alkyl group.
$—[CH_2CR_3R_5]_c—$ may also be the residue formed by co-polymerization with dimethyldiallyl ammonium chloride. In this case the charge-containing residue $—[CH_2CR_3R_5]_c—$ will be the form of monomers with repeat units of structure:

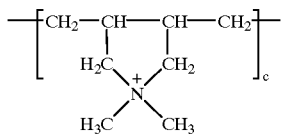

The amount of the synthetic polymeric additive added to the fibers or the tissue web can be from about 0.02 to about 4 weight percent, on a dry fiber basis, more specifically from about 0.05 to about 2 weight percent, and still more specifically from about 0.1 to about 1 weight percent. The synthetic polymer can be added to the fibers or web at any point in the process, but it can be particularly advantageous to add the synthetic polymer to the fibers while the fibers are suspended in water.

Methods of making paper products which can benefit from the various aspects of this invention are well known to those skilled in the papermaking art. Exemplary patents include U.S. Pat. No. 5,785,813 issued Jul. 28, 1998 to Smith et al. entitled "Method of Treating a Papermaking Furnish For Making Soft Tissue"; U.S. Pat. No. 5,772,845 issued Jun. 30, 1998 to Farrington, Jr. et al. entitled "Soft Tissue"; U.S. Pat. No. 5,746,887 issued May 5, 1998 to Wendt et al. entitled "Method of Making Soft Tissue Products"; and U.S. Pat. No. 5,591,306 issued Jan. 7, 1997 to Kaun entitled "Method For Making Soft Tissue Using Cationic Silicones", all of which are hereby incorporated by reference.

DETAILED DESCRIPTION OF THE INVENTION

To further describe the invention, examples of the synthesis of some of the various chemical species are given below.

Modified Vinyl Polymer

First with regard to the modified vinyl polymers, they can be made via free radical polymerization of vinyl monomers of the form:

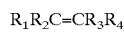

where $R_1$, $R_2$, $R_3$, $R_4$ may be H, halogen, alkyl, functional alkyl, aryl, functional aryl. For papermaking the polyacrylamides ($R_4$=$—CONH_2$), polyvinyl alcohols ($R_4$=$—OH$), and polyacrylates ($R_4$=$—COOR'$, R'=H, Me) are the most widely used.

Of the modified vinyl polymers, polyacrylamides (PAMs) are used as dry strength additives in addition to their widespread use as drainage and retention aids. They are water-soluble polymers containing primary amide groups that can form hydrogen bonds with cellulose molecules in fibers thereby increasing interfiber bonding. They are synthesized by the free radical polymerization of acrylamide as shown in Reaction 1.

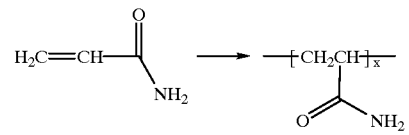

Reaction 1

PAMs are nonionic materials and have very little attraction to papermaking fibers. Therefore it is necessary to incorporate charged groups into the polymer structure to make it useful for papermaking. Both anionic and cationic polyacrylamides are known in the art.

Anionic polyacrylamides can be produced by: (1) copolymerization of acrylamide with acrylic acid; and (2) hydrolysis of some of the amide groups on the polyacrylamide chain. The resultant polymer will contain a mixture of acrylamide and acrylic acid groups. Anionic polyacrylamides were first produced in the 1950's via copolymerization of acrylamide with acrylic acid. The acrylic acid groups introduce an ionizable carboxyl group on the polymer backbone. Ionization of these carboxyl groups is highly pH dependent where above pH 7 essentially 100% of the carboxyl groups are ionized. Since anionic polyacrylamides are negatively charged they are not directly attracted to the like charged cellulose fibers. A cationic substance such as alum must be used in conjunction with them to promote their retention.

To avoid the need for a cationic promoter, another approach is to incorporate cationic groups directly into the polymer backbone. Having been commercially produced since the late 1960's these cationically charged polyacrylamides are the most common form of dry strength PAM's. Cationic polyacrylamides are produced by copolymerization of acrylamide with cationic monomers or by modification of some of the amide groups. A typical reaction is illustrated in Reaction 2 for co-polymerization with Methacryuloyloxyethyl trimethyl ammonium methosuffate (METAMS). Typical cationic monomers include: (1) methacryuloyloxyethyl trimethyl ammonium methosulfate; (2) dimethyldiallyl ammonium chloride (DMDAAC); (3) 3-acryloamido-3-methyl butyl trimethyl ammonium chloride (AMBTAC); (4) trimethylamino methacrylate; and (5) vinyl benzyl trimethyl ammonium chloride (VBTAC). Such materials have structures similar to that shown in Reaction 2 for METAMS copolymerized cationic PAM.

When used as retention aids a broader range of molecular weights and charge densities may be employed. Key characteristics of polyacrylamide retention aids include the molecular weight, the type of charge, the charge density and the delivery form. For the average molecular weight, the range can be: low (1,000–100,000); medium (100,000–1,000,000); high (1,000,000–5,000,000); very high (>5,000,000). The charge type can be nonionic, cationic, anionic or amphoteric. The charge density can be: low (1–10%); medium (10–40%); high (40–80%); or very high (80–100%). The delivery form can be either an emulsion, an aqueous solution or a dry solid.

High molecular weight/low charge density flocculants are used most often for retention of fine particles in high shear and turbulence environments. Low molecular weight/high charge density products are used for their charge modifying capabilities and for retention in low shear environments.

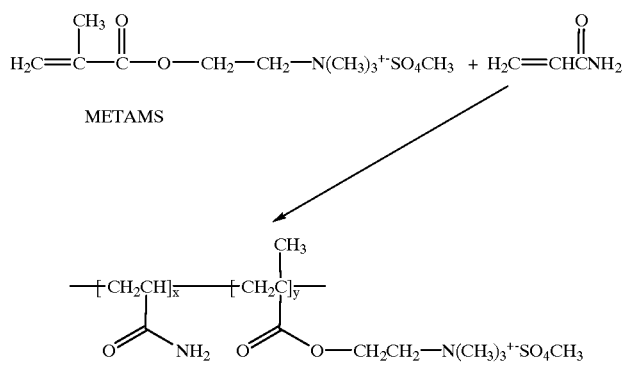

Reaction 2

The incorporation of cationic groups through modification of non-ionic polyacrylamide is most often accomplished via the Mannich reaction as illustrated in Reaction 3. Generally cationic polyacrylamides will contain from about 5 to about 70% mole percent cationic groups.

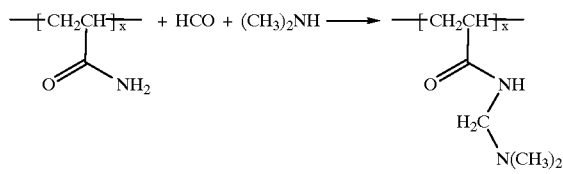

Reaction 3

Generally dry strength PAMs are supplied as ready to use aqueous solutions or as water-soluble powders which must be dissolved prior to use. They may be added to thin or thick stock at a point of good mixing for best results. Addition rates of 0.1% to 0.5% of dry fiber typically give best results. High addition rates may cause overcationization of the furnish and reduce the effectiveness of other additives.

When used as dry strength additives usually around 10 mole % of the monomers will contain charged groups. Unlike the anionic PAM's, cationic PAM's are effectively charged across the entire pH range. Typical molecular weights for cationic PAM dry strength aids are in the range of 100,000 to 500,000. The molecular weight is important so as to be low enough to not bridge between particles and cause flocculation, and yet high enough to retard migration of the polymer into the pores of the fibers. Such migration would cause a reduction in dry strength activity.

Polysiloxanes

With regard to the polysiloxane component, polysiloxanes can be made using a three-step synthesis: chlorosilane synthesis, chlorosilane hydrolysis, followed by polymerization and polycondensation.

Chlorosilane Synthesis:

$$Si + RCl \longrightarrow SiR'_4$$

where:

R=H, methyl or ethyl group, and
$R'_4$=Cl, H, methyl or ethyl.

This reaction is exothermic with a yield as high as 90%. A copper-based catalyst is usually used. The resulting various chloroalkylsilanes can be separated by fractionation distillation. If desired, silanes of other functionalities can be obtained via further reactions. For instance:

$$MeSiCl_2 + C_6H_5MgBr \longrightarrow Me(C_6H_5)SiCl_2 + MgClBr$$
(Phenyl-)

(Grignard Reaction)

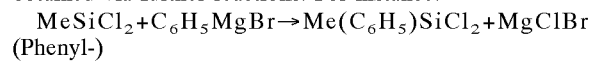

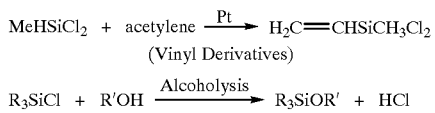

where

R=alkyl, aryl, or other organofunctional group.
R'=methyl, ethyl or acetoxy

Chlorosilane Hydrolysis:

Dimethyidichlorosilanes undergo exothermic hydrolysis to yield disilanols which further condense to produce a variety of linear and/or cyclic oligomers:

$$x \text{ Me}_2\text{SiCl}_2 \xrightarrow[-\text{HCl}]{+\text{H}_2\text{O}} y \text{ HO(Me}_2\text{SiO)}_n\text{H} + z \text{ (Me}_2\text{SiO)}_n$$
$$\qquad\qquad\qquad\qquad\quad \text{linear} \qquad\quad \text{cyclic}$$

$n=20–50$; and
$m \geq 3$

The linear and cyclic oligomers from the above hydrolysis need to be further polymerized or condensed to produce a silicone macromolecule of sufficient length.

Cyclic Polymerization

The $(R_2SiO)_n$ cyclic oligomers undergo ring opening and polymerization to form long linear chains. Polymer chain length are determined by the presence(concentration) of the chain endblocker.

$$z \text{ (Me}_2\text{SiO)}_n + \text{KOH} \longrightarrow \text{(Me}_2\text{SiO)}_y + \text{KO(Me}_2\text{SiO)}_m\text{H}$$

$$\sim\!\!\sim\!\!\text{MeSiOK} + \text{Me}_3\text{SiOSiMe}_3 \longrightarrow \sim\!\!\sim\!\!\text{Me}_2\text{SiOSiMe}_3 + \text{Me}_3\text{SiOK}$$

wherein
$m \geq 1$
$n \geq 3$
$z \geq 1$

Copolymerization in the presence of a catalyst ($Me_4NOH$) can be carried out in the following scheme:
$$R_3SiOSi\ R_3 + x\ (R_2SiO)_4 \rightarrow R_3SiO(R_2SiO)_n\ Si\ R_3$$

where

R=alkyl, aryl, or other organofunctional group.
$n \geq 4$

Linear Condensation

The linear silanol condenses to give long chain siloxanes.

$$\sim\!\!\sim\!\!\text{OSiR}_2\text{OH} + \text{HOR}_2\text{SiO}\!\sim\!\!\sim \longrightarrow$$

$$\sim\!\!\sim\!\!\text{O}-\underset{R}{\overset{R}{\underset{|}{\overset{|}{\text{Si}}}}}-\text{O}-\underset{R}{\overset{R}{\underset{|}{\overset{|}{\text{Si}}}}}-\text{O}\!\sim\!\!\sim + \text{H}_2\text{O}$$

where

R=alkyl, aryl, or other organofunctional group

Attached to the silicon atom are organic side chains including alkyl, aliphatic hydrocarbons, phenyl or vinyl groups. By adjusting the —SiO— chain length, the side chain functionality and the crosslinking between molecular chains, silicones form an almost infinite number of hybrid polymers. In fact, the industry has created a plethora of novel silicones to provide various end use properties such as chemical compatibility, solubility, water repellency, lubrication, foam control, releasing aid, cooling, sealing, adhesion, coating and substantivity.

Organoreactive polysiloxanes and silanes are very useful in making hybrid polymers. The following are a few examples:

Copolymerization of vinyl silanes with an organic monomer:

$$x\ \text{H}_2\text{C}\!=\!\text{CH}-\text{SiR}_3 + y\ \text{H}_2\text{C}\!=\!\text{CH}-\text{R}' \longrightarrow$$

$$-(\text{CH}_2-\underset{\underset{\text{SiR}_3}{|}}{\text{CH}})_x-(\text{CH}_2-\underset{\underset{\text{R}'}{|}}{\text{CH}})_y-$$

where
$R_3$ and $R'$ are chlorine, amine, methoxy, acetoxy, hydroxyl, vinyl, or silicone hydride functionalities
$x \geq 1$
$y \geq 1$ Grafting the silicones to an organic polymer backbone:

$$-(\text{CH}_2\text{CHR}')_x- + \text{H}_2\text{C}\!=\!\text{CHSiR}_3 \longrightarrow -(\text{CH}_2\text{CH})_x-$$
$$\qquad\qquad\qquad\qquad\qquad\qquad\qquad\qquad\qquad\quad |$$
$$\qquad\qquad\qquad\qquad\qquad\qquad\qquad\qquad\quad \text{CH}_2\text{CH}_2\text{SiR}_3$$

where
R and R' are chlorine, amine, methoxy, acetoxy, hydroxyl, vinyl, or silicone hydride functionalities
$x \geq 1$ Addition of silicone functionality:
$$H-SiR_3 + R'OH \rightarrow R_3Si-OR' + H_2$$

where
R'=any organofunctional group
R=alkyl, aryl, or other organofunctional group.

Modified Vinyl Polymers Containing Polysiloxanes

There are several envisioned pathways in which synthetic polymers containing hydrogen bonding groups and polysiloxanes can be combined onto a single molecule (structures 1 and 2) for purposes of this invention. These include, but are not limited to: (1) block co-polymerization and/or grafting ; (2) direct monomer incorporation ; and (3) derivatization of functional groups on the polymer backbone. Each of these methods is described below. Since these materials maintain their bonding and/or charge characteristics they would be expected to maintain their dry strength and or retention capabilities as well as provide for materials with enhanced tactile properties due to introduction of the polysiloxane moieties.

The molar and weight ratios of the various functional groups on the polymer will largely depend on the specific application of the material and is not a critical aspect of the invention. However, with regard to structure 1, the portion of the synthetic polymer [$Q_1$] capable of forming hydrogen, covalent and ionic bonds can constitute from about 10 to about 90 weight percent of the total polymer, more specifically from about 20 to about 80 weight percent of the total polymer and still more specifically from about 30 to about 70 weight percent of the total polymer. The polysiloxane portion [$Q_2$] of the synthetic polymer can constitute from about 10 to about 90 weight percent of the synthetic polymer, more specifically from about 20 to about 80 weight percent of the synthetic polymer and still more specifically from about 30 to about 70 weight percent of the synthetic polymer. The charge containing portion [$Q_3$] of the synthetic polymer can be comprised of monomer units constituting from 0 to about 80 mole percent of the total monomer units in the synthetic polymer, more specifically from 0 to about 30 mole percent and still more specifically from about 5 to about 15 mole percent. The [$Q_4$] functionality will be comprised of monomer units constituting from 0 to about 80 mole percent of the total monomer units in the synthetic polymer, more specifically from 0 to about 40 mole percent and still more specifically from 0 to about 20 mole percent.

Likewise the molecular weight of the synthetic polymers of the present invention will largely depend on the specific application of the material and is not overly critical to the invention. The weight average molecular weight range can be from about 1,000 to about 5,000,000, more specifically from about 10,000 to about 2,000,000 and still more specifically from about 20,000 to about 1,000,000. Where these polymers are added for dry strength it is important that the molecular weight of the polymer be low enough so as to not bridge between particles and cause flocculation, and yet high enough so as to retard migration of the polymer into the pores of the fibers. These materials can have weight average molecular weights in the range of from about 5,000 to about 1,000,000, more specifically from about 10,000 to about 1,000,000 and still more specifically from about 20,000 to about 600,000.

Block copolymerization and/or grafting.

In this aspect of the invention one or more of the $[Q]_f$ elements of the polymer exists as a block or graft copolymer on the vinyl backbone. These synthetic polymers are distinguished from those of the direct monomer incorporation in that the polysiloxane portion of the molecule would be incorporated linearly within the polymer chain rather than in a pendant fashion. It should be appreciated that any of the synthetic polymer elements or combination of the synthetic polymer elements $Q_1$, $Q_2$, $Q_3$, $Q_4$ could be incorporated via this approach. Note that where a polyacrylamide is employed that these polymers maintain pendant amide functionality and are therefore capable of being glyoxylated to form materials possessing temporary wet strength.

Direct monomer incorporation.

Incorporation of the polysiloxane moieties can be accomplished via copolymerization with vinyl type monomers containing aliphatic groups. Almost any vinyl type monomer containing a pendant polysiloxane moiety can be co-polymerized with acrylamide or a similar vinyl monomer containing a pendant hydrogen-bonding moiety to be incorporated into the polymer backbone. Generically the synthesis can be described in Reaction 4.

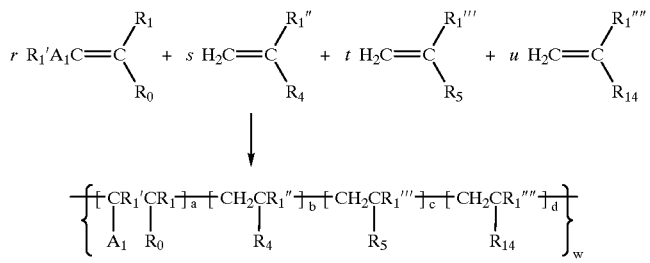

Reaction 4
where:
$R_1$, $R_1'$, $R_1''$, $R_1'''$, $R_1''''$=H, $C_{1-4}$alkyl;
a,b≧1;
c,d≧0;
w≧1;
r,s≧1;
t,u≧0;
a*w=r;
b*w=s;
c*w=t;
d*w=u;
$R_0$=any group capable of forming hydrogen or covalent bonds with cellulose.

Preferred are —$CONH_2$, COOH, $COO^-$, —OH, CONHCHOHCHO, and anhydride including mixtures of said groups;
$A_1$=H, COOH;
$R_4$=Z-$R_6$-Y radical where:
Z=Aryl, $CH_2$, COO—, CONH—, —O—, —S—, —$OSO_2O$—, —CONHCO—, CONHCHOHCHOO—, any radical capable of bridging the $R_6$ group to the vinyl backbone portion of the molecule;
Y=H, —N+$R_7R_8$, $R_9$, —$NR_7R_8$, where $R_7$, $R_8$, $R_9$ are same or different and are H or $C_{1-30}$ aliphatic hydrocarbons;
$R_5$=any aliphatic, linear or branched, saturated or unsaturated, substituted or non-substituted hydrocarbon;
$R_{14}$=a moiety necessary for making the material into a form suitable for papermaking. $R_{14}$ may take the form of -$Z_1$-$R_{14}$ where $Z_1$ is any bridging radical whose purpose is to provide incorporation into the polymer backbone and $R_{14}$ is as defined previously. $R_{14}$ may be incorporated to offset the increased polymer hydrophobicity caused by introduction of the polysiloxane moieties. Examples of suitable $R_{14}$ moieties are (but is not limited to) the aliphatic polyether derivatives of the formula —$[(CR_1R_2)_x O]_y$—$R_{15}$, wherein $R_1$, $R_2$ is H or $CH_3$, x≧2, y≧1 and $R_{15}$ is any suitable terminal group including —$CH_3$, —H, —$C_2H_5$, —$NH_2$ and the like; and At least one of $R_6$, $R_7$, $R_8$, $R_9$ must be a $C_8$ or higher linear or branched, saturated or unsaturated, substituted or non-substituted, aliphatic hydrocarbon.

More specifically, $R_5$=$Z_3$-$R_{10}$-W, where:
$Z_3$=Aryl, $CH_2$, COO—, CONH—, —O—, —S—, —$OSO_2O$—, any radical capable of bridging the R10 group to the vinyl backbone portion of the molecule;
$R_{10}$=any linear or branched, aliphatic or aromatic hydrocarbon of 2 or more carbons, preferably —$(CH_2CH_2)$—, —$C(CH_3)_2CH_2CH_2$—; and
W=—$N^+R_{11}$,$R_{12}$,$R_{13}$ where $R_{11}$, $R_{12}$, $R_{13}$ is a $C_{1-4}$ alkyl group.

$R_5$ can also be the residue formed by co-polymerization with dimethyidiallyl ammonium chloride. In this case the residue will be the form of monomers with repeat units of structure:

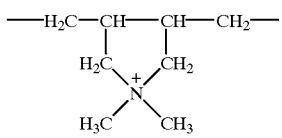

Polymers of the type shown in Reaction 4, which maintain pendant amide functionality, may further be modified to produce materials exhibiting temporary wet strength as well as dry strength. Most notably this may be accomplished through reaction with glyoxal. The general reaction scheme is given in Reaction 5.

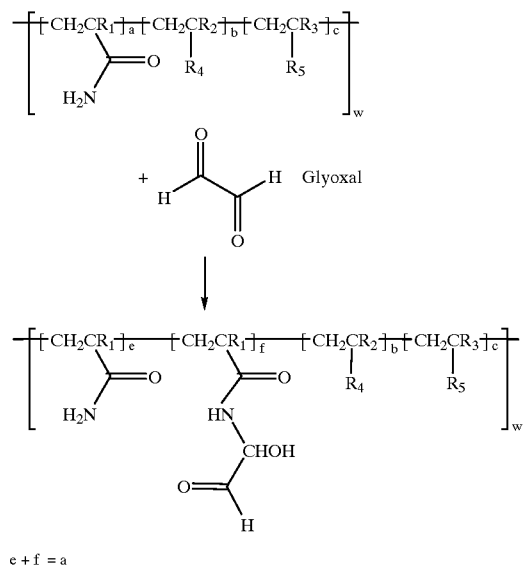

Reaction 5

Incorporation of polysiloxanes can be accomplished via two primary routes: a) incorporation via copolymerization with vinyl type monomers containing polysiloxanes or silane groups and b) reaction with functional groups attached to the modified polyvinyl backbone.

Almost any vinyl type polymer can be co-polymerized with acrylamide to be incorporated into the polymer backbone. Generically the synthesis can be described in Reaction 6.

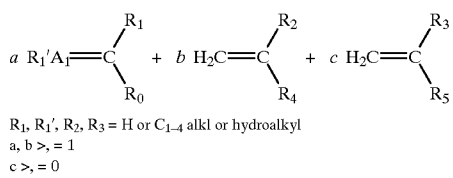

$R_1$, $R_1'$, $R_2$, $R_3$ = H or $C_{1-4}$ alkl or hydroalkyl
a, b >, = 1
c >, = 0

Reaction 6 where $R_0$=any group capable of forming hydrogen bonds. Preferred but not limited to are —$CONH_2$, OH, COOH, COO— including mixtures of said groups.

$A_1$=COOH, H

Z=Ar, $CH_2$, COO—, CONH—, —O—, —S—, —$OSO_2O$—, —CONHCO—, —CONHCHOHCHOO—, or any radical capable of bridging the R6 group to the vinyl backbone portion of the molecule.

$R_4$=Si(R')$_2$—O—[Si(R")$_2$—O]$_n$—Si(R''')$_3$ where R', R", R''' can be the same or different, are selected from the following groups: H, OH, aryl, or alkyl or aliphatic hydrocarbon, $C_{1-40}$, linear or branched, saturated or unsaturated, substituted or non-substituted, with or without ethyoxylation and/or propoxylation.

$R_5$=$Z_3$-$R_{10}$-W $Z_3$=Ar, $CH_2$, COO—, CONH—, —O—, —S—, —$OSO_2O$—, any radical capable of bridging the $R_{10}$ group to the vinyl backbone portion of the molecule.

$R_{10}$=any linear or branched, aliphatic or aromatic hydrocarbon of 2 or more carbons, preferably —($CH_2CH_2$)—, —$C(CH_3)_2CH_2CH_2$—W=—N+$R_{11}$,$R_{12}$,$R_{13}$ where $R_{11}$, R12,$R_{13}$ is a $C_{1-4}$alkyl group.

$CH_2$=$CR_3R_5$ may also be dimethyidiallyl ammonium chloride. In this case the residue will be the form of monomers with repeat units of structure

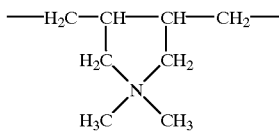

A specific example is given as follows with synthesis shown in Reaction 7. Vinyl siloxanes and polysiloxanes are known commercially available materials. They will have the general structure $R_1R_2$=$R_3R_4$ where $R_4$ will contain the siloxane or polysiloxane moiety and $R_1$, $R_2$, $R_3$ can be H, or various organic radicals including alkyl, alkoxy, etc. They would be expected to incorporate into any vinyl type polymer such as a PAM, PVA, etc. They would be incorporated directly into the polymer during the polymerization process as described below. Description shown is specific for a polyacrylamide but is applicable to any vinyl type polymer. As such the siloxanes are arranged on the polymer in a pendant fashion.

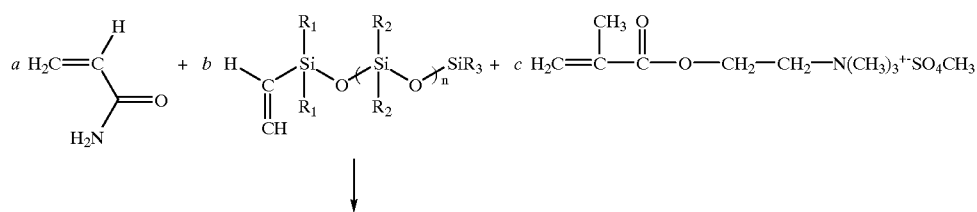

-continued

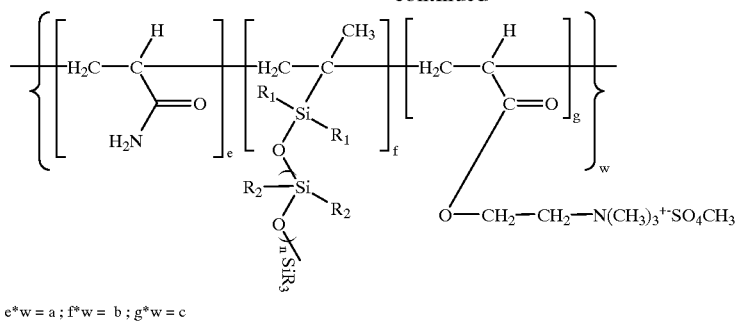

e*w = a ; f*w = b ; g*w = c

Reaction 7 where $R_1, R_2$ = H, OH, alkyl, hydroxyalkyl, substituted or unsubstituted, linear or branched of chain length $C_{1-30}$, or $-(CH_2)_p-O-(EtO)_q-(PO)_r-R_1'$, where $p \geq 0$, $q+r \geq 1$ $R_1'$ = H, Alkyl or hydroxyalkyl of $C_1-C_{30}$, substituted or unsubstituted, linear or branched;

R = H, OH, alkyl, hydroxyalkyl, $C_1-C_{30}$, or $-(CH_2)_n-N(R')_2$ where

R' = H, alkyl, or hydroxyalkyl, substituted or unsubstituted, linear or branched, $C_1-C_{30}$ Note that since these polymers maintain pendant amide functionality they are capable of being glyoxylated to form materials possessing temporary wet strength as shown in Reaction 8.

Reaction 8 where $R_1, R_2$ = H, OH, alkyl, hydroxyalkyl, substituted or unsubstituted, linear or branched of chain length $C_{1-30}$, or $-(CH_2)_p-O-(EtO)_q-(PO)_r-R_1'$, where $p \geq 0$, $q+r \geq 1$ $R_1'$ = H, Alkyl or hydroxyalkyl of $C_1-C_{30}$, substituted or unsubstituted, linear or branched;

R = H, OH, alkyl, hydroxyalkyl, $C_1-C_{30}$, or $-(CH_2)_n-N(R')_2$ where

R' = H, alkyl, or hydroxyalkyl, substituted or unsubstituted, linear or branched, $C_1-C_{30}$ Derivitization of functional groups on the polymer backbone The second approach to synthesis of materials of structures 1 and 2 is to modify the functional groups on the polymer backbone. The vinyl type polymers, including the

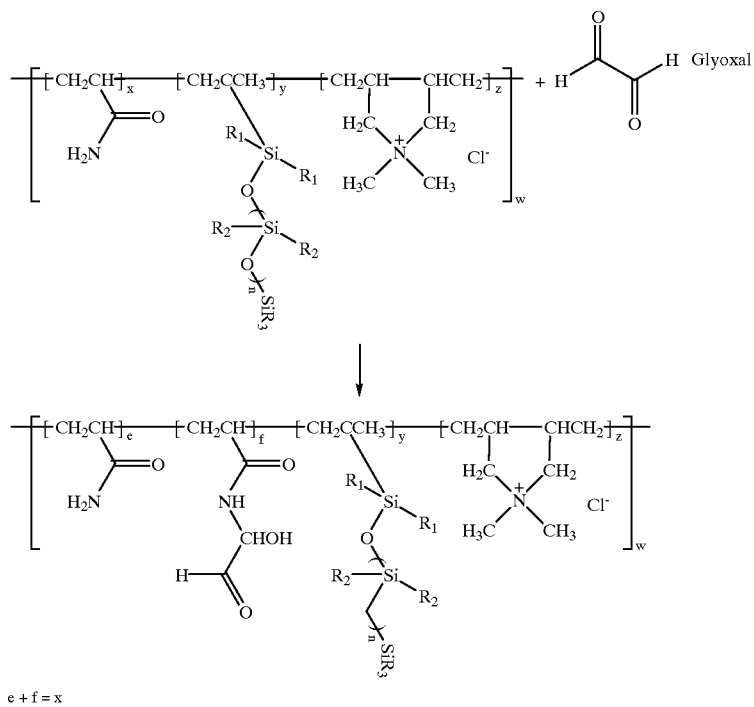

e + f = x modified polyacrylamides, polyacrylic acid and polyvinyl alcohol contain functional groups which may be further derivatized to produce materials of Reaction 4. The polymer functional groups which may be reacted upon include but are not limited to: amide, acyl, carboxyl, hydroxyl, cyano, and aldehyde (from glyoxylation or similar reaction). In general the starting polymer will be one of that shown in the following structure 3:

$R_1$, $R_1'$, $R_2$, $R_3$=H, $C_{1-4}$ alkyl or hydroxyalkyl a, b>,=1 c>,=0

Structure 3 where $R_1$, $R_1'$, $R_2$, $R_3$=H, $C_{1-4}$ alkyl or hydroxyalkyl a, b>,=1 c>,=0

$R_0$=any group capable of forming hydrogen bonds. Preferred are —$CONH_2$, COOH, OH, COO— including mixtures of said groups.

$Z_4$=—CONHCHOHCHO, —$CONH_2$, —COOH, —R—CN, —OH, —SH, —$NH_2$, —OH or any other functional group capable of being reacted upon in a manner so as to incorporate a polysiloxane chain, (substituted or unsubstituted) into the polymer.

$R_5$=$Z_3$-$R_{10}$-W $Z_2$=Ar, $CH_2$, COO—, CONH—, —O—, —S—, —$OSO_2O$—, any radical capable of bridging the $R_{10}$ group to the vinyl backbone portion of the molecule.

$R_{10}$=any linear or branched, aliphatic or aromatic hydrocarbon of 2 or more carbons, preferably —($CH_2CH_2$), —$C(CH_3)_2CH_2CH_2$—W=—$N^+R_{11},R_{12},R_{13}$ where $R_{11}$, $R_{12}$, $R_{13}$ is a $C_{1-4}$alkyl group.

—$[CH_2CR_3R_5]_c$— may also be the residue formed by copolymerization with dimethyldiallyl ammonium chloride. In this case the residue will be the form of monomers with repeat units of structure

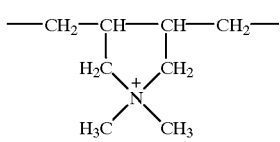

Materials such as those shown in structure 3 are amenable to reaction with a large variety of reagents as a means of incorporating polysiloxanes into the polymer. A general derivatization scheme is shown in Reaction 9 with specific example given in Reaction 10.

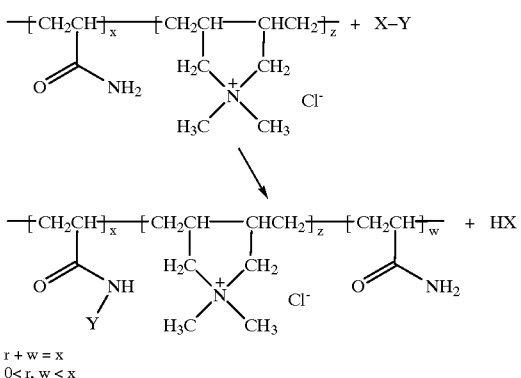

Reaction 9 where

X=a functional end group including —Cl, —H, —OH attached to the polysiloxane capable of being reacted upon by a functional group attached to the other polymer in a manner so as to incorporate the polysiloxane moiety (substituted or unsubstituted, may contain various degrees of ethoxylation or propoxylation, may contain various functional linkages such as ester, ether, amide, or amine) into the polymer;

Y=the polysiloxane moiety.

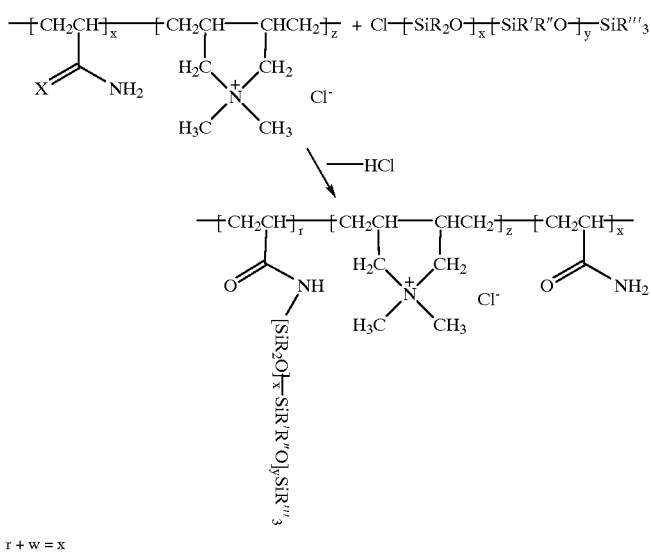

Reaction 10 where
x,y=1–5000;
R, R', R'''=$CH_3$;
R''=$-(CH_2)_a-O-(C_2H_5O)_m-(C_3H_7O)_n-OH$
where
a=2–6;
m=1–1000;
n=1–500.

If the end block functional groups are not reactive enough, silane coupling agents may be used to bridge the vinyl and the siloxane polymers. An example is shown in Reaction 11. Silane coupling agents have been used extensively by those skilled in the art to semipermanently modify a substrate. In the skin care area, they have been used with materials to provide long lasting protective benefits such as: (1) nonocclusive water barriers to prevent over hydration of the skin; (2) humectants; (3) skin conditioners; (4) antimicrobials; and (5) sunscreening agents, etc. The same coupling agents can be bonded to a cellulosic substrate to attach, e.g., germicidal or lubricating function to a tissue or towel or wipe.

$$-[[Q_1]_a-[Q_2]_b-[Q_3]_c-[Q_4]_d]_w-$$

where:
a,b>0;
c,d≧0;
w≧1;
$Q_1$=a monomer unit or a block or graft copolymer of an ethylenically unsaturated hydrocarbon containing a pendant group capable of forming hydrogen or covalent bonds with cellulose;
$Q_2$=a block or graft copolymer containing siloxane bonds;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking.

2. The paper sheet of claim 1 wherein the pendant group on $Q_1$ capable of forming hydrogen or covalent bonds is selected from the group consisting of $-CONH_2$, $-COOH$, $-COO^-M^+$, $-OH$, $-CONHCHOHCHO$ and mixtures thereof, wherein $M^+$ is a counter ion.

3. The paper sheet of claim 1 wherein $Q_2$ is of the form $-Z_1-Q_2-Z_1'-$ where $Z_1$, $Z_1'$ are bridging radicals, which can be the same or different.

4. The paper sheet of claim 1 wherein $Q_4$ is of the form $-Z_2-Q_4-Z_2'-$ where $Z_2$, $Z_2'$ are bridging radicals, which can be the same or different.

5. The paper sheet of claim 1 wherein $Q_4$ is a radical of the form $-CHR_1CR_{30}R_1'-$ wherein $R_{30}$ is an aliphatic polyether derivative of the formula $-[(CR_2R_2)_xO]_y-_3$ where:
$R_1$, $R_1'$ is $-H$, $C_{1-4}$alkyl;
$R_2$, $R_2'$ is $-H$ or $-CH_3$;
x≧2;
y≧2; and
$R_3$ is a terminal group selected from the group consisting of $-CH_3$, $-H$, $-C_2H_5$, and $-NH_2$.

Reaction 11 where
x,y=1–5000;
R, R', R'''=$CH_3$;
R''=$-(CH_2)_a-O-(C_2H_5O)_m-(C_3H_7O)_n-OH$
where:
a=2–6;
m=1–1000;
n=1–500.

It will be appreciated that the foregoing examples, given for purposes of illustration, are not to be construed as limiting the scope of this invention, which is defined by the following claims and all equivalents thereto.

We claim:

1. A paper sheet comprising a synthetic polymer having hydrogen bonding capability and containing one or more polysiloxane moieties, said polymer having the following structure:

6. The paper sheet of claim 1 wherein $Q_3$ is

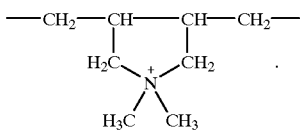

7. The paper sheet of claim 1 wherein $Q_3$ is a radical of the form —$CHR_1CR_{20}R_1'$— wherein $R_{20}$=a pendant group of the form $Z_1$-$R_{10}$-W, where $Z_1$ is a bridging radical bonding the $R_{10}$ group to the polymer;

$R_1$ and $R_1'$ are —H or a $C_{1-4}$alkyl group;

$R_{10}$=any linear or branched, aliphatic or aromatic hydrocarbon of 2 or more carbons; and W=—N+$R_{11}$,$R_{12}$,$R_{13}$ where $R_{11}$, $R_{12}$, $R_{13}$ is a $C_{1-4}$ alkyl group.

8. The paper sheet of claim 7 wherein $Z_1$ is selected from the group consisting of aryl, —$CH_2$—, —COO—, —OOC—, —CONH—, —O—, —S—, —NHCO— and $OSO_2O$—.

9. The paper sheet of claim 7 wherein $R_{10}$ is —$(CH_2CH_2)$— or —$C(CH_3)_2CH_2CH_2$—.

10. The paper sheet of claim 1 wherein "c" is 0.

11. The paper sheet of claim 1 wherein "d" is 0.

12. The paper sheet of claim 1 wherein the pendant group on $Q_1$ capable of forming hydrogen bonds is —$CONH_2$.

13. The paper sheet of claim 1 wherein the pendant group on $Q_1$ capable of forming covalent bonds is —CONHCHOHCHO.

14. The paper sheet of claim 1 wherein $Q_1$ has —$CONH_2$ and —CONHCHOHCHO pendant groups.

15. A paper sheet comprising a synthetic polymer having hydrogen bonding capability and containing one or more polysiloxane moieties, said polymer having the following structure:

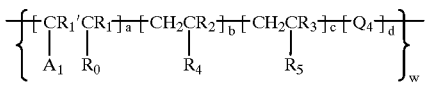

where:

W≧1;

$R_1$,$R_1'$,$R_2$, $R_3$=H or $C_{1-4}$alkyl;

a, b>0;

c,d≧0;

$R_0$=a group capable of forming hydrogen or covalent bonds with cellulose;

$Q_4$=a monomer unit or a block or graft copolymer containing a hydrophilic moiety;

$A_1$=—H, —COOH;

$R_4$=a $Z_1$-$R_6$ radical, where:

$Z_1$=any radical capable of bonding the $R_6$ group to the polymer;

$R_6$=a block or graft copolymer containing siloxane bonds;

$R_5$=$Z_3$-$R_{10}$-W, where:

$Z_3$=any radical capable of bonding the $R_{10}$ group to the polymer;

$R_{10}$=any linear or branched, aliphatic or aromatic hydrocarbon of 2 or more carbons; and W=—N+$R_{11}$,$R_{12}$,$R_{13}$, where $R_{11}$, $R_{12}$, $R_{13}$ are $C_{1-4}$ alkyl groups.

16. The paper sheet of claim 15 wherein $R_0$ is selected from the group consisting of —$CONH_2$, —COOH, —COO⁻M⁺, —OH, —CONHCHOHCHO, and mixtures thereof, wherein M⁺ is a counter ion.

17. The paper sheet of claim 15 wherein $Q_4$ is of the form -$Z_2$-$Q_4$-$Z_2'$- where $Z_2$, $Z_2'$ are bridging radicals, which can be the same or different.

18. The paper sheet of claim 15 wherein $Z_1$ is selected from the group consisting of aryl, —$CH_2$—, —COO—, —OOC—, —CONR'—, —NR'OC—, —O—, —S—, —$OSO_2O$—, —CONHCO—, and —CONHCHOHCHOHO—, —CONHCHOHCHOHNH— and where R' is H or $C_{1-4}$ alkyl.

19. The paper sheet of claim 15 wherein $Z_1$ is selected from the group consisting of aryl, —$CH_2$—, —COO—, —CONH—, —O—, —S, and —$OSO_2O$—.

20. The paper sheet of claim 15 wherein $R_{10}$ is —$(CH_2CH_2)$— or —$C(CH_3)_2CH_2CH_2$—.

21. The paper sheet of claim 15 wherein $A_1$ is —H and $R_0$ is —$CONH_2$.

22. The paper sheet of claim 15 wherein $A_1$ is —H and $R_0$ is —CONHCHOHCHO.

23. The paper sheet of claim 15 wherein $R_0$ consists of both —$CONH_2$ and —CONHCHOHCHO groups.

24. A paper sheet comprising a synthetic polymer having a moiety capable of forming covalent or hydrogen bonds with cellulose and containing one or more amphiphilic hydrocarbon moieties, said polymer having the following structure:

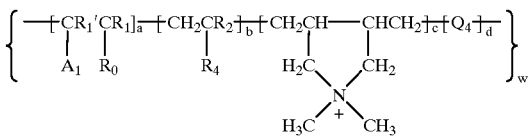

where:

w≧1;

$R_1$,$R_1'$,$R_2$, $R_3$=H or $C_{1-4}$ alkyl;

a,b>0;

c,d≧0;

$R_0$=a group capable of forming hydrogen or covalent bonds with cellulose;

$Q_4$=a monomer unit or a block or graft copolymer containing a hydrophilic moiety;

$A_1$=—H,—COOH;

$R_4$=a $Z_1$-$R_6$ radical, where:

$Z_1$=any radical capable of bonding the $R_6$ group to the polymer;

$R_6$=an amphiphilic hydrocarbon radical.

25. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

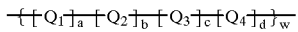

where:

a,b>0;

$c, d \geq 0$;
$w \geq 1$;
$Q_1$=a monomer unit or a block or graft copolymer of an ethylenically unsaturated hydrocarbon containing a pendant group capable of forming hydrogen or covalent bonds with cellulose;

$Q_2$=a block or graft copolymer containing siloxane bonds;

$Q_3$=a monomer unit or a block or graft copolymer containing a charge funtionality; and $Q_4$=a monomer unit or a block or graft copolymer containing a hydrophilic moiety, which is desirable for making the material into a form suitable for papermaking.

26. The method of claim 25 wherein the pendant group on $Q_1$ capable of forming hydrogen or covalent bonds is selected from the group consisting of —$CONH_2$, —COOH, —$COO^-M^+$, —OH, —CONHCHOHCHO and mixtures thereof, wherein $M^+$ is a counter ion.

27. The method of claim 25 wherein $Q_2$ is of the form -$Z_1$-$Q_2$-$Z_1'$- where $Z_1$, $Z_1'$ are bridging radicals, which can be the same or different.

28. The method of claim 25 wherein $Q_4$ is of the form -$Z_2$-$Q_4$-$Z_2'$- where $Z_2$, $Z_2'$ are bridging radicals, which can be the same or different.

29. The method of claim 25 wherein $Q_4$ is a radical of the form —$CHR_1CR_0R_1'$— wherein $R_0$ is an aliphatic polyether derivative of the formula —$[(CR_2R_2')_xO]_y$—$R_3$
where:
$R_1$, $R_1'$ is —H, $C_{1-4}$ alkyl;
$R_2$, $R_2'$ is —H or —$CH_3$;
$x \geq 2$;
$y \geq 2$; and
$R_3$ is a terminal group selected from the group consisting of —$CH_3$, —H, —$C_2H_5$, and —$NH_2$.

30. The method of claim 25 wherein $Q_3$ is

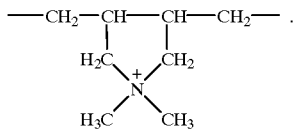

31. The method of claim 25 wherein $Q_3$ is a radical of the form —$CHR_1CR_0R_1'$— wherein
$R_0$=a pendant group of the form $Z_1$-$R_{10}$-W, where $Z_1$ is a radical capable of bonding the $R_{10}$ group to the polymer;
$R_1$ and $R_1'$ are —H or a $C_{1-4}$ alkyl group;
$R_{10}$=any linear or branched, aliphatic or aromatic hydrocarbon of 2 or more carbons; and
W=—$N^+R_{11},R_{12},R_{13}$ where $R_{11}$, $R_{12}$, $R_{13}$ is a $C_{1-4}$ alkyl group.

32. The method of claim 31 wherein $Z_1$ is selected from the group consisting of aryl, —$CH_2$—, —COO—, —CONH—, —O—, —S—, and —$OSO_2O$—.

33. The method of claim 31 wherein $R_{10}$ is —$(CH_2CH_2)$— or —$C(CH_3)_2CH_2CH_2$—.

34. The method of claim 25 wherein "c" is 0.

35. The method of claim 25 wherein "d" is 0.

36. The method of claim 25 wherein the pendant group on $Q_1$ capable of forming hydrogen bonds is —$CONH_2$.

37. The method of claim 25 wherein the pendant group on $Q_1$ capable of forming covalent bonds is —CONHCHOHCHO.

38. The method of claim 25 wherein $Q_1$ has —$CONH_2$ and —CONHCHOHCHO pendant groups.

39. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

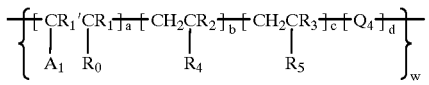

where:
$w \geq 1$;
$R_1, R_1', R_2, R_3$=H or $C_{1-4}$alkyl;
$a, b > 0$;
$c, d \geq 20$;
$R_0$=a group capable of forming hydrogen or covalent bonds with cellulose;
$Q_4$=a monomer unit or a block or graft copolymer containing a hydrophilic moiety;
$A_1$=—H, —COOH;
$R_4$=a $Z_1$-$R_6$ radical,
where:
$Z_1$=any radical capable of bonding the $R_6$ group to the polymer;
$R_6$=a block or graft copolymer containing siloxane bonds;
$R_5$=$Z_3$-$R_{10}$-W,
where:
$Z_3$=any radical capable of bonding the $R_{10}$ group to the polymer;
$R_{10}$=any linear or branched, aliphatic or aromatic hydrocarbon of 2 or more carbons; and
W=—$N^+R_{11},R_{12},R_{13}$, where $R_{11}$, $R_{12}$, $R_{13}$ are $C_{1-4}$ alkyl groups.

40. The method of claim 39 wherein $R_0$ is selected from the group consisting of —$CONH_2$, —COOH, —$COO^-M^+$, —OH, —CONHCHOHCHO, and mixtures thereof, wherein $M^+$ is a counter ion.

41. The method of claim 39 wherein $Q_4$ is of the form -$Z_2$-$Q_4$-$Z_2'$— where $Z_2$, $Z_2'$ are bridging radicals, which can be the same or different.

42. The method of claim 39 wherein $Z_1$ is selected from the group consisting of aryl, —$CH_2$—, —COO—, —OOC—, —CONR'—, —NR'CO—, —O—, —S—, —$OSO_2O$—, —CONHCO—, and —CONHCHOHCOHO—, CONHCHOHCOHNH—, and where R' is H or $C_{1-4}$alkyl.

43. The method of claim 39 wherein $Z_1$ is selected from the group consisting of aryl, —$CH_2$—, —COO—, —CONH—, —O—, —S—, and —$OSO_2O$—.

44. The method of claim 39 wherein $R_{10}$ is —$(CH_2CH_2)$ or —$C(CH_3)_2CH_2CH_2$—.

45. The method of claim 39 wherein $A_1$ is —H and $R_0$ is —$CONH_2$.

46. The method of claim 39 wherein $A_1$ is —H and $R_0$ is —CONHCHOHCHO.

47. The method of claim 39 wherein $R_0$ consists of both —$CONH_2$ and —CONHCHOHCHO groups.

48. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

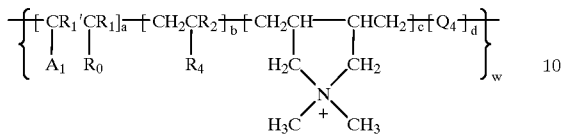

where:
$w \geq 1$;
$R_1, R_1', R_2, R_3 = $H or $C_{1-4}$alkyl;
a, b>0;
c,d$\geq$0 such that c+d>0;
$R_0$=a group capable of forming hydrogen or covalent bonds with cellulose;
$Q_4$=a monomer unit or a block or graft copolymer containing a hydrophilic moiety;
$A_1$=—H, —COOH;
$R_4$=a $Z_1$-$R_6$,
where:
$Z_1$=any radical capable of bonding the $R_6$ group to the polymer;
$R_6$=a block or graft copolymer containing siloxane bonds.

49. A paper sheet comprising a synthetic polymer having hydrogen bonding capability and containing one or more polysiloxane moieties, said polymer having the following structure:

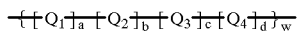

where:
a,b>0;
c,d>0;
$w \geq 1$;
$Q_1$=a monomer unit or a block or graft copolymer containing a pendant group capable of forming hydrogen or covalent bonds with cellulose;
$Q_2$=a block or graft copolymer containing siloxane bonds;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking.

50. The paper sheet of claim 49 wherein the pendant group on $Q_1$ capable of forming hydrogen or covalent bonds is selected from the group consisting of —$CONH_2$, —COOH, —$COO^-M^+$, —OH, —CONHCHOHCHO and mixtures thereof, wherein $M^+$ is a counter ion.

51. The paper sheet of claim 49 wherein $Q_2$ is of the form -$Z_1$-$Q_2$-$Z_1$'- where $Z_1$, $Z_1$' are bridging radicals, which can be the same or different.

52. The paper sheet of claim 49 wherein $Q_4$ is of the form -$Z_2$-$Q_4$-$Z_2$'- where $Z_2$, $Z_2$' are bridging radicals, which can be the same or different.

53. The paper sheet of claim 49 wherein $Q_4$ is a radical of the form —$CHR_1CR_{30}R_1$'— wherein $R_{30}$ is an aliphatic polyether derivative of the formula —$[(CR_2R_2')_xO]_y$—$R_3$ where:
$R_1, R_1'$ is —H, $C_{1-4}$alkyl;
$R_2, R_2'$ is —H or —$CH_3$;
$x \geq 2$;
$y \geq 2$; and
$R_3$ is a terminal group selected from the group consisting of —$CH_3$, —H, —$C_2H_5$, and —$NH_2$.

54. The paper sheet of claim 49 wherein $Q_3$ is

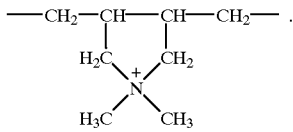

55. The paper sheet of claim 49 wherein $Q_3$ is a radical of the form —$CHR_1CR_{20}R_1$'— wherein
$R_{20}$=a pendant group of the form $Z_1$-$R_{10}$-W where $Z_1$ is a bridging radical capable of bonding the $R_{10}$ group to the polymer;
$R_1$ and $R_1$' are —H or a $C_{1-4}$ alkcyl group;
$R_{10}$=any linear or branched, aliphatic or aromatic hydrocarbon of 2 or more carbons; and
W=—N+$R_{11}$,$R_{12}$,$R_{13}$ where $R_{11}$, $R_{12}$, $R_{13}$ is a $C_{1-4}$alkyl group.

56. The paper sheet of claim 55 wherein $Z_1$ is selected from the group consisting of aryl, —$CH_2$—, —COO—, —OOC—, —CONH—, —O—, —S—, —NHCO— and —$OSO_2O$—.

57. The paper sheet of claim 55 wherein $R_{10}$ is —($CH_2CH_2$)— or —$C(CH_3)_2CH_2CH_2$—.

58. The method of claim 49 wherein the pendant group on $Q_1$ capable of forming hydrogen bonds is —$CONH_2$.

59. The method of claim 49 wherein the pendant group on $Q_1$ capable of forming covalent bonds is —CONHCHOHCHO.

60. The method of claim 49 wherein $Q_1$ has —$CONH_2$ and CONHCHOHCHO pendant groups.

61. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

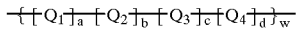

where:
a,b>0;
c,d>0;
$w \geq 1$;
$Q_1$=a monomer unit or a block or graft copolymer containing a pendant group capable of forming hydrogen or covalent bonds with cellulose;
$Q_2$=a block or graft copolymer containing siloxane bonds;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking.

62. The method of claim 61 wherein the pendant group on $Q_1$ capable of forming hydrogen or covalent bonds is selected from the group consisting of —$CONH_2$, —COOH —$COO^-M^+$, —OH, —CONHCHOHCHO and mixtures thereof, wherein $M^+$ is a counter ion.

63. The method of claim 61 wherein $Q_2$ is of the form $-Z_1-Q_2-Z_1'-$ where $Z_1$, $Z_1'$ are bridging radicals, which can be the same or different.

64. The method of claim 61 wherein $Q_4$ is of the form $-Z_2-Q_4-Z_2'-$ where $Z_2$, $Z_2'$ are bridging radicals, which can be the same or different.

65. The method of claim 61 wherein $Q_4$ is a radical of the form —$CHR_1CR_{30}R_1'$— wherein $R_{30}$ is an aliphatic polyether derivative of the formula —$[(CR_2R_2)_xO]_y$—$R_3$ where:

$R_1$, $R_1'$ is —H, $C_{1-4}$alkyl;

$R_2$, $R_2'$ is —H or —$CH_3$;

$x \geq 2$;

$y \geq 2$; and $R_3$ is a terminal group selected from the group consisting of —$CH_3$, —H, —$C_2H_5$, and —$NH_2$.

66. The method of claim 61 wherein $Q_3$ is $$—CH_2—CH—CH—CH_2—$$
with $H_2C$, $CH_2$ bonded to $N^+$ bearing $H_3C$, $CH_3$.

67. The method of claim 61 wherein $Q_3$ is a radical of the form —$CHR_1CR_{20}R_1'$— wherein $R_{20}$=a pendant group of the form $Z_1$-$R_{10}$-W, where $Z_1$ is a bridging radical capable of bonding the $R_{10}$ group to the polymer;

$R_1$ and $R_1'$ are —H or a $C_{1-4}$alkyl group;

$R_{10}$=any linear or branched, aliphatic or aromatic hydrocarbon of 2 or more carbons; and W=—$N^+R_{11},R_{12},R_{13}$ where $R_{11}$, $R_{12}$, $R_{13}$ is a $C_{1-4}$alkyl group.

68. The method of claim 67 wherein $Z_1$ is selected from the group consisting of aryl, —$CH_2$—, —COO—, —CONH—, —O—, —S—, and —$OSO_2O$—.

69. The method of claim 67 wherein $R_{10}$ is —($CH_2CH_2$)— or —$C(CH_3)_2CH_2CH_2$—.

70. The method of claim 61 wherein the pendant group on $Q_1$ capable of forming hydrogen bonds is —$CONH_2$.

71. The method of claim 61 wherein the pendant group on $Q_1$ capable of forming covalent bonds is —CONHCHOHCHO.

72. The method of claim 61 wherein $Q_1$ has —$CONH_2$ and —CONHCHOHCHO pendant groups.

73. A paper sheet comprising a synthetic polymer having hydrogen bonding capability and containing one or more polysiloxane moieties, said polymer having the following structure:

$$-[-[Q_1]_a-[Q_2]_b-[Q_3]_c-[Q_4]_d-]_w$$

where:

a,b>0;

c,d$\geq$0;

w$\geq$1;

$Q_1$ is selected from the group consisting of —$CONH_2$, —COOH, —$COO^-M^+$, —OH, —CONHCHOHCHO and mixtures thereof, wherein $M^+$ is a counter ion;

monomer unit or a block or graft copolymer containing a pendant group capable of forming hydrogen or covalent bonds with cellulose;

$Q_2$=a block or graft copolymer containing siloxane bonds;

$Q_3$=a monomer unit or a block or graft copolymer containing a charge functionality; and $Q_4$=a monomer unit or a block or graft copolymer containing a hydrophilic moiety, which is desirable for making the material into a form suitable for papermaking.

74. The paper sheet of claim 73 wherein $Q_2$ is of the form $-Z_1-Q_2-Z_1'-$ where $Z_1$, $Z_1'$ are bridging radicals, which can be the same or different.

75. The paper sheet of claim 73 wherein $Q_4$ is of the form $-Z_2-Q_4-Z_2'-$ where $Z_2$, $Z_2'$ are bridging radicals, which can be the same or different.

76. The paper sheet of claim 73 wherein $Q_4$ is a radical of the form —$CHR_1CR_{30}R_1'$— wherein $R_{30}$ is an aliphatic polyether derivative of the formula —$[(CR_2R_2)_xO]_y$—$R_3$ where:

$R_1$, $R_1'$ is —H, $C_{1-4}$alkyl;

$R_2$, $R_2'$ is —H or —$CH_3$;

$x \geq 2$;

$y \geq 2$; and $R_3$ is a terminal group selected from the group consisting of —$CH_3$, —H, —$C_2H_5$, and —$NH_2$.

77. The paper sheet of claim 73 wherein $Q_3$ is $$—CH_2—CH—CH—CH_2—$$
with $H_2C$, $CH_2$ bonded to $N^+$ bearing $H_3C$, $CH_3$.

78. The paper sheet of claim 73 wherein $Q_3$ is a radical of the form —$CHR_1CR_{20}R_1'$— wherein $R_{20}$=a pendant group of the form $Z_1$-$R_{10}$-W where $Z_1$ is a bridging radical capable of bonding the $R_{10}$ group to the polymer;

$R_1$ and $R_1'$ are —H or a $C_{1-4}$alkyl group;

$R_{10}$=any linear or branched, aliphatic or aromatic hydrocarbon of 2 or more carbons; and W=—$N^+R_{11},R_{12},R_{13}$ where $R_{11}$, $R_{12}$, $R_{13}$ is a $C_{1-4}$ alkyl group.

79. The paper sheet of claim 78 wherein $Z_1$ is selected from the group consisting of aryl, —$CH_2$—, —COO—, —OOC—, —CONH—, —O—, —S—, —NHCO— and —$OSO_2O$—.

80. The paper sheet of claim 78 wherein $R_{10}$ is —($CH_2CH_2$)— or —$C(CH_3)_2CH_2CH_2$—.

81. The paper sheet of claim 73 wherein "c" is 0.

82. The paper sheet of claim 71 wherein "d" is 0.

83. The paper sheet of claim 73 wherein the pendant group on $Q_1$ capable of forming hydrogen bonds is —$CONH_2$.

84. The paper sheet of claim 73 wherein the pendant group on $Q_1$ capable of forming covalent bonds is —CONHCHOHCHO.

85. The paper sheet of claim 73 wherein $Q_1$ has —$CONH_2$ and —CONHCHOHCHO pendant groups.

86. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

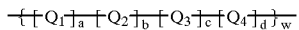

where:
- a,b>0;
- c,d≧0;
- w≧1;
- $Q_1$ is selected from the group consisting of —$CONH_2$, —COOH, —COO⁻M⁺, —OH, CONHCHOHCHO and mixtures thereof, wherein M⁺ is a counter ion;
- $Q_2$=a block or graft copolymer containing siloxane bonds;
- $Q_3$=a monomer unit or a block or graft copolymer containing a charge functionality; and
- $Q_4$=a monomer unit or a block or graft copolymer containing a hydrophilic moiety, which is desirable for making the material into a form suitable for papermaking.

87. The method of claim 86 wherein $Q_2$ is of the form -$Z_1$-$Q_2$-$Z_1$'- where $Z_1$, $Z_1$' are bridging radicals, which can be the same or different.

88. The method of claim 86 wherein $Q_4$ is of the form -$Z_2$-$Q_4$-$Z_2$'- where $Z_2$, $Z_2$' are bridging radicals, which can be the same or different.

89. The method of claim 86 wherein $Q_4$ is a radical of the form —$CHR_1CR_{30}R_1$'— wherein $R_{30}$ is an aliphatic polyether derivative of the formula —$[(CR_2R_2)_xO]_y$—$R_3$ where:
- $R_1$, $R_1$' is —H, $C_{1-4}$alkyl;
- $R_2$, $R_2$' is —H or —$CH_3$;
- x≧2;
- y≧2; and $R_3$ is a terminal group selected from the group consisting of —$CH_3$, —H, —$C_2H_5$, and —$NH_2$.

90. The method of claim 86 wherein $Q_3$ is

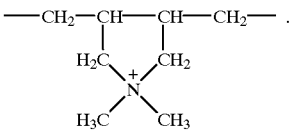

91. The method of claim 86 wherein $Q_3$ is a radical of the form —$CHR_1CR_{20}R_1$'— wherein
- $R_{20}$=a pendant group of the form $Z_1$-$R_{10}$-W, where $Z_1$ is a bridging radical capable of bonding the $R_{10}$ group to the polymer;
- $R_1$ and $R_1$' are —H or a $C_{1-4}$alkyl group;
- $R_{10}$=any linear or branched, aliphatic or aromatic hydrocarbon of 2 or more carbons; and
- W=—N+$R_{11}$,$R_{12}$,$R_{13}$ where $R_{11}$, $R_{12}$, $R_{13}$ is a $C_{1-4}$alkyl group.

92. The method of claim 91 wherein $Z_1$ is selected from the group consisting of aryl, —$CH_2$—, —COO—, —CONH—, —O—, —S—, and —$OSO_2O$—.

93. The method of claim 91 wherein $R_{10}$ is —($CH_2CH_2$)— or —$C(CH_3)_2CH_2CH_2$—.

94. The method of claim 86 wherein "c" is 0.

95. The method of claim 86 wherein "d" is 0.

96. The method of claim 86 wherein the pendant group on $Q_1$ capable of forming hydrogen bonds is —$CONH_2$.

97. The method of claim 86 wherein the pendant group on $Q_1$ capable of forming covalent bonds is —CONHCHOHCHO.

98. The method of claim 86 wherein $Q_1$ has —$CONH_2$ and —CONHCHOHCHO pendant groups.

* * * * *

UNITED STATES PATENT AND TRADEMARK OFFICE
CERTIFICATE OF CORRECTION

PATENT NO. : 6,224,714 B1
APPLICATION NO. : 09/449261
DATED : May 1, 2001
INVENTOR(S) : W. Z. Schroeder et al.

It is certified that error appears in the above-identified patent and that said Letters Patent is hereby corrected as shown below:

At Column 1, line 29, insert -- be -- between the words "may" and "desirable",
At Column 5, line 44, delete "p0" and begin a new paragraph with "$Z_3$".
At Column 5, line 53, insert -- - -- after "co".
At Column 6, after line 13, insert -- $w \geq 1$ --.
At Column 9, line 8, delete "methosuffate" and replace with -- methosulfate --.
At Column 10, line 12, delete "weightalow" and replace with -- weight/low --.
At Column 10, line 62, insert --(Alkoxy Derivatives) --.
At Column 11, line 3, delete "Dimethyid" and replace with -- Dimethyldi --.
At Column 11, line 43, insert -- $x \geq 1$ --.
At Column 13, line 22, delete $[Q]_f$ and replace with -- $[Q]_l$ --.
At Column 14, line 35, delete "R10" and replace with -- $R_{10}$ --.
At Column 14, line 43, delete "dimethyidiallyl" and replace with
-- dimethyldially --.
At Column 16, line 30, delete "R12" and replace with -- $R_{12}$ --.
At Column 16, line 31, delete "dimethyidiallyl" and replace with
--dimethyldially --.
In the structure bridging columns 17 and 18, the top line reading "H - $CH_3$ - H", delete the last "H" and replace with -- $CH_3$ --.
At Column 20, the third structure, first line, delete "$_x$" and replace with -- $_r$ --.
At Column 20, the fifth structure, first line, delete "$_x$" and replace with -- $_w$ --.
At Column 22, line 59, delete "—$_3$" and replace with -- —$R_3$ --.
At Column 26, line 22, delete "$c,d \geqq 20$" and replace with -- $c,d \geq 20$ --.

At Column 28, line 23, delete "alkcyl" and replace with -- alkyl --.
At Column 29, line 14, delete "$R_2$" and replace with -- $R'_2$ --.
At Column 30, line 23, delete "$R_2$" and replace with -- $R'_2$ --.

UNITED STATES PATENT AND TRADEMARK OFFICE
CERTIFICATE OF CORRECTION

PATENT NO. : 6,224,714 B1
APPLICATION NO. : 09/449261
DATED : May 1, 2001
INVENTOR(S) : W. Z. Schroeder et al.

It is certified that error appears in the above-identified patent and that said Letters Patent is hereby corrected as shown below:

At Column 31, line 34, delete "$R_2$" and replace with -- $R'_2$ --.

Signed and Sealed this

First Day of August, 2006

JON W. DUDAS
*Director of the United States Patent and Trademark Office*